United States Patent
Toyoda

(12) 
(10) Patent No.: US 6,582,095 B1
(45) Date of Patent: Jun. 24, 2003

(54) SPREAD ILLUMINATING APPARATUS

(75) Inventor: Koichi Toyoda, Iwata-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 56 days.

(21) Appl. No.: 09/583,541

(22) Filed: Jun. 1, 2000

(30) Foreign Application Priority Data

Jul. 23, 1999 (JP) ............................................. 11-209011

(51) Int. Cl.$^7$ ................................................. F21V 8/00
(52) U.S. Cl. ............................ 362/235; 362/31; 362/26; 362/311; 362/555
(58) Field of Search ........................... 362/31, 555, 800, 362/235, 311, 351, 367, 361, 360, 26

(56) References Cited

U.S. PATENT DOCUMENTS 6,288,700 B1 * 9/2001 Mori ............................ 345/102
6,305,813 B1 * 10/2001 Lekson et al. ................. 362/31
6,396,634 B1 * 5/2002 Ishikawa et al. ............. 359/599

FOREIGN PATENT DOCUMENTS

JP 10-182076 7/1998

* cited by examiner

Primary Examiner—Alan Cariaso
Assistant Examiner—Anabel Ton
(74) Attorney, Agent, or Firm—Oliff & Berridge, PLC

(57) ABSTRACT

In the spread illuminating apparatus in which the light emitted from the light emitting diode 4, which is disposed close to the transparent substrate 2, is made to be emitted toward the viewing direction of the transparent substrate 2, the groove 2a is provided on the transparent substrate 2 in such a manner as it crosses orthogonally light emitted in a radial direction from the light emitting diode 4 so that most light beams 5a, 5b, 5c can be emitted toward the viewing direction. Since the light beams 5a, 5b and 5c progress in the viewing direction through the groove 2a, an amount of light turning aside to no purpose can be reduced.

7 Claims, 5 Drawing Sheets

SPREAD ILLUMINATING APPARATUS

BACKGROUND OF THE INVENTION

1. Field of the Invention

This invention relates to a spread illuminating apparatus for a display portion of a personal computer, a word processor, etc.(hereinafter referred to as "person com").

2. Conventional Art

For a display of a personal computer, a cathode ray tube (so called a picture tube) has been used primarily. However, since it is large in size, heavy in weight and in addition high in power consumption, recently a liquid crystal panel has been increasingly used. Therefore, a liquid crystal panel with a large number of picture elements has been developed and miniaturization of other electronic parts has been accelerated, so that a small size of personal computers such as a notebook type or the like has been rapidly becoming popular. In addition, a liquid crystal panel has been heavily used for miniaturized portable information appliances and other electronic appliances. Thus the demand for the liquid crystal panels has rapidly increased. Since the liquid crystal itself does not emit light, an illuminating apparatus is required and, for example, a cold cathode fluorescent lamp (CCFL) or a hot cathode fluorescent lamp (HCFL) has been conventionally used. In either case, a fluorescent lamp needs a high voltage for discharging between electrodes. Therefore, an oscillating circuit using semiconductors was provided and a voltage generated from oscillation was supplied to a fluorescent lamp.

Since a personal computer is an aggregation of electric circuit and electric device, itself consumes an electric power. Therefore, a study for saving the power has been developed, and at present, an appliance with a remarkably reduced power consumption has been available compared with previous one. This is seen particularly in a portable personal computer called "notebook type." However, if the illuminating apparatus is large in power consumption, most of the electric power generated in a battery is consumed in this illuminating apparatus.

Therefore, a liquid crystal panel which uses a white light emitting diode in place of a fluorescent lamp has been developed, and a patent application has been already filed by the present applicant (see patent application No. Hei 10-182076). One embodiment of this system is explained based on FIG. 7. In this system, a transparent substrate 2 is placed on an upper surface of a liquid crystal panel 1, so that a viewer looking from the above in figure is adapted to see an image of the liquid crystal panel 1 through the transparent substrate 2.

The transparent substrate 2 is identical with a liquid crystal panel 1 in configuration, that is, rectangle when seen from above. On one end thereof a bar-like light conductive member 3 is disposed. FIG. 7 shows as if the liquid crystal panel 1 and the transparent substrate 2 were apart, and the transparent substrate 2 and the light conductive member 3 were apart respectively, but actually all the parts are disposed tight to each other so that light goes through them efficiently. On the surface of the transparent substrate 2, a number of grooves 2a triangular in section are provided in parallel with each other as shown in FIG. 8. Further, an optical path conversion means (as later explained) is provided on a portion of the light conductive member 3.

On both ends of the light conductive member 3, light emitting diodes 4, 4 (LED) as a light emitting body are disposed. In FIG. 7, this light emitting diode 4 is also apart from the light conductive member 3, but actually it is disposed tight to the light conductive member 3. The color of a light emitted from the light emitting diode 4 is white, and the diode is surrounded with a case or the like, when necessary, so that most of the light, when emitted with electric current supplied, is directed toward the light conductive member 3. In this structure, the light emitted from the light emitting diodes 4, 4 is directed through the light conductive member 3 toward the transparent substrate 2 and illuminates it. Then the light is refracted by the groove 2a of the transparent substrate 2 toward the liquid crystal panel 1 and illuminates it. The image of the illuminated liquid crystal panel 1 is viewed by a viewer through the transparent substrate 2.

In the structure explained above, the light conductive member 3 is, as explained, provided with an optical path conversion means. The optical path conversion means is formed by coarsening a portion of the surface of the light conductive member 3, or is formed by applying a white coating to a portion of the surface of the light conductive member 3, or is formed, as shown in figure, by providing a prism-shaped part 3a continuously on one portion of the surface of the light conductive member 3, or is formed by coarsening whole surface of the light conductive member 3.

In the above structure, the light emitted from the light emitting diode 4 is introduced to the light conductive member 3 and is refracted by the optical path conversion means of the light conductive member 3 toward the transparent substrate 2. Accordingly, a portion of the light emitted from the light emitting diode 4, which emits a smaller amount of the light than a fluorescent lamp, is consumed by the light conductive member 3 and the amount of light to illuminate the transparent substrate 2 is lessened to that extent.

Accordingly, it is suggested that the light from the light emitting diode 4 is applied directly to the transparent substrate 2 without using the light conductive member 3 as shown in FIG. 9. In this case, the light emitting diode 4 is disposed at center portion of one side of the transparent substrate 2 and emits light. Then, the central light beam 5a of light 5 diffused from the light emitting diode 4 in a radial direction is refracted at the groove 2a toward the liquid crystal panel 1 and illuminates it and its reflected light proceeds toward viewing direction, but diffused light beams 5b and 5c do not proceed toward the viewing direction but turn aside toward the side of the transparent substrate 2 to no purpose.

In order to prevent this from happening, it is suggested to dispose the light emitting diode 4 at a corner portion of the transparent substrate 2, as shown in FIG. 10. However, even if doing so, some of the light beam (5b) still does not proceed toward the viewing direction but turn aside toward the side of the transparent substrate 2 to no purpose.

After conducting various kinds of experiments for the cause of turning aside of the light, the present inventor has confirmed the cause of the turning aside. That is, when the light meets the groove 2a of the transparent substrate 2 at right angles, it proceeds toward the viewing direction, and when meeting the groove 2a at other angles, it may turn aside.

The present invention has been completed in the light of the above point, and the purpose thereof is to provide a spread illuminating apparatus in which the groove is disposed in such direction as crossing the light at right angles so that the light is prevented from easily turning aside toward outside.

SUMMARY OF THE INVENTION

According to a first aspect of the invention, a spread illuminating apparatus, in which at least one spot-like light source is disposed close to a transparent substrate made of light permeable material and the light from the spot-like light source is made to be emitted toward the viewing direction of the transparent substrate, is characterized by that a light emitting element consisting of groove, recessed portion, convex portion, curved surface or a combination thereof is disposed in such a manner as it may cross orthogonally most light beams available emitted from the spot-like light source in the radial direction so that as much light as possible can be emitted toward the viewing direction.

According to a second aspect of the invention, the first aspect of the invention is characterized by that the transparent substrate is rectangular, the spot-like light source is disposed at one corner of the transparent substrate facing toward the inside of the transparent substrate, a plurality of light emitting elements are provided on the transparent substrate and the light emitting elements are disposed linearly in such a manner as they may cross orthogonally most light beams available emitted from the spot-like light source in the radial direction so that as much light as possible can be emitted toward the viewing direction.

According to a third aspect of the invention, the first aspect of the invention is characterized by that the transparent substrate is rectangular, the spot-like light source is disposed at one corner of the transparent substrate facing toward the inside of the transparent substrate, a plurality of light emitting elements are provided on the transparent substrate and the light emitting elements are disposed curvilinearly in such a manner as they may cross orthogonally light beams emitted from the spot-like light source in the radial direction so that as much light as possible can be emitted toward the viewing direction.

According to a fourth aspect of the invention, the first aspect of the invention is characterized by that the transparent substrate is rectangular, the spot-like light source is disposed at one side of the transparent substrate facing toward the inside of the transparent substrate, a plurality of light emitting elements are provided on the transparent substrate and the light emitting elements are disposed curvilinearly in such a manner as they may cross orthogonally light beams emitted from the spot-like light source in the radial direction so that as much light as possible can be emitted toward the viewing direction.

According to a fifth aspect of the invention, the first aspect of the invention is characterized by that the transparent substrate is rectangular, a plurality of the spot-like light sources are disposed at sides of the transparent substrate at a spacing facing toward the inside of the transparent substrate, a plurality of light emitting elements are provided on the transparent substrate and the light emitting elements are disposed curvilinearly in such a manner as they may cross orthogonally light beams emitted from the spot-like light source in the radial direction so that as much light as possible can be emitted toward the viewing direction.

According to a sixth aspect of the invention, the first aspect of the invention is characterized by that the transparent substrate is rectangular, the spot-like light sources are disposed at one or both of diagonal corners of the transparent substrate, a plurality of light emitting elements are provided on the transparent substrate and the light emitting elements are disposed curvilinearly in such a manner as they may cross orthogonally light beams emitted from the spot-like light sources in the radial direction so that as much light as possible can be emitted toward the viewing direction.

According to a seventh aspect of the invention, the first aspect of the invention is characterized by that the transparent substrate is rectangular, the spot-like light sources are disposed slantwise at corners on one or plural number of sides, a plurality of light emitting elements are provided on the transparent substrate and the light emitting elements are disposed curvilinearly in such a manner as they may cross orthogonally light beams emitted from the spot-like light sources in the radial direction so that as much light as possible can be emitted toward the viewing direction.

Thus, when the grooves as a light emitting pattern on the spread member are disposed slantwise or curvedly according to the characteristics (angular spreading, peak direction) of a light source to be installed, in either aspect of the present invention, most of the light diffused is adapted to cross the groove orthogonally, so that the light is effectively refracted toward the viewing direction to reduce substantially the light turning aside outward.

EMBODIMENT

Figure 8:
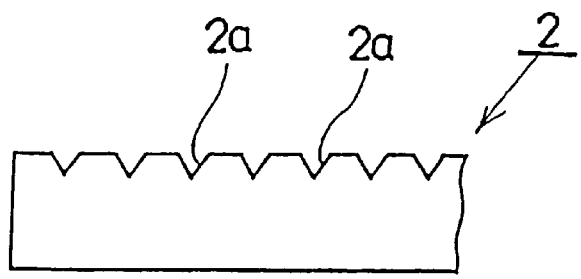
FIG. 8 is an enlarged side view of the groove of the transparent substrate of FIG. 7
Figure 9:
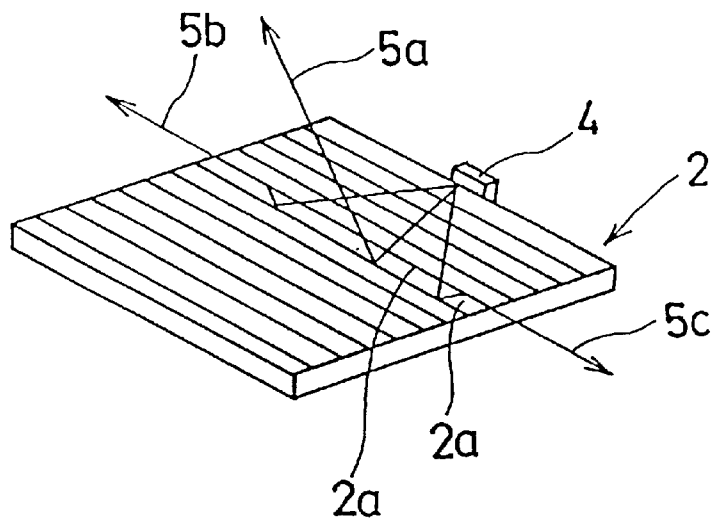
FIG. 9 is a perspective view of a conventional one in which a light emitting diode illuminates the transparent substrate directly.
Figure 10:
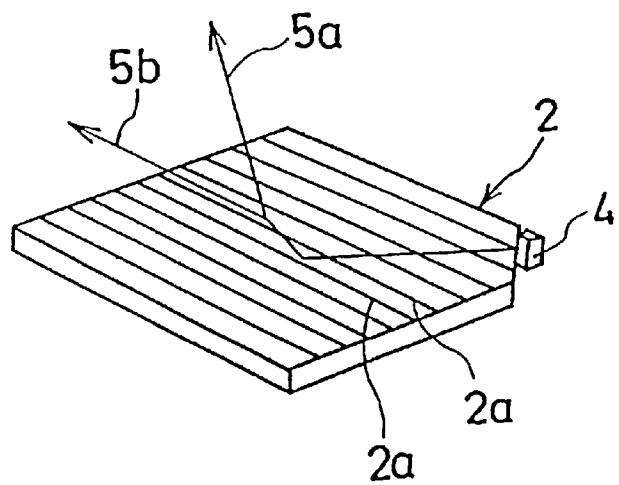
FIG. 10 is a perspective view showing a variation of FIG. 9.

Hereinafter, embodiments of the present invention are explained based on the drawings. The present invention relates to a spread illuminating apparatus, in which a light emitting diode 4 as a spot-like light source is disposed close to a transparent substrate 2 made of light permeable material, light from this light emitting diode 4 is made to go through the transparent substrate 2 and to be refracted toward the front viewing direction, wherein a groove 2a as a light emitting element is provided on the transparent substrate 2 in such a manner as it crosses light beams 5a, 5b and 5c proceeding forward from the light emitting diode 4. And, the configuration of the groove 2a is made to differ in each embodiment. The configuration of the side of the groove 2a is identical with the one shown in FIG. 8.

Figure 1:
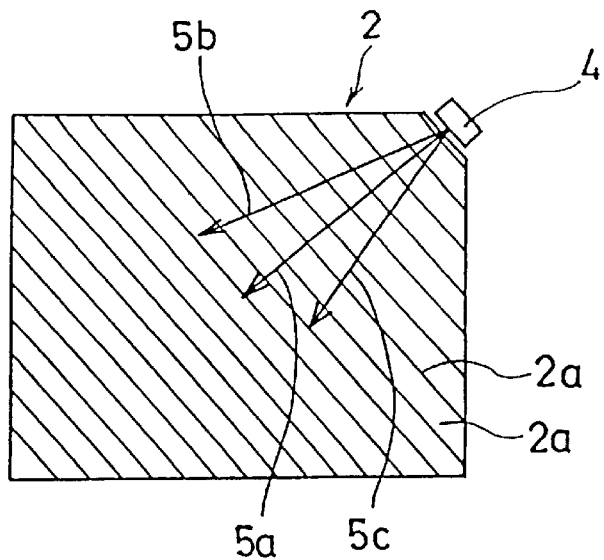
FIG. 1 is a plan view showing schematically one embodiment of the present invention.

The embodiment shown in FIG. 1 corresponds to the second aspect of the present invention, wherein, the transparent substrate 2 is rectangular and the light emitting diode 4 is disposed at one corner of the transparent substrate 2 facing diagonally, and a plurality of grooves 2a of the transparent substrate 2 are disposed linearly parallel to each other and orthogonal to the diagonal direction in which the light emitting diode 4 is facing.

Figure 2:
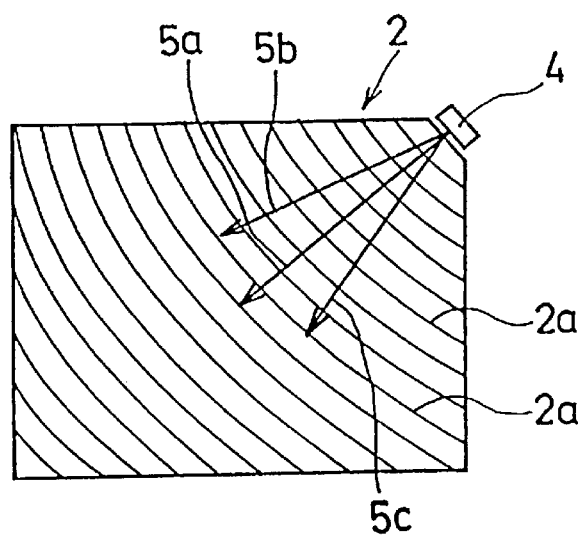
FIG. 2 is a plan view showing schematically another embodiment of the present invention.

Next, the embodiment shown in FIG. 2 corresponds to the third aspect of the present invention, which is identical with what is shown in FIG. 1 in that the transparent substrate 2 is rectangular, that the light emitting diode 4 is disposed at a corner of the transparent substrate 2 facing diagonally, and how a plurality of grooves 2a of the transparent substrate 2 are disposed except that they are arched.

Figure 3:
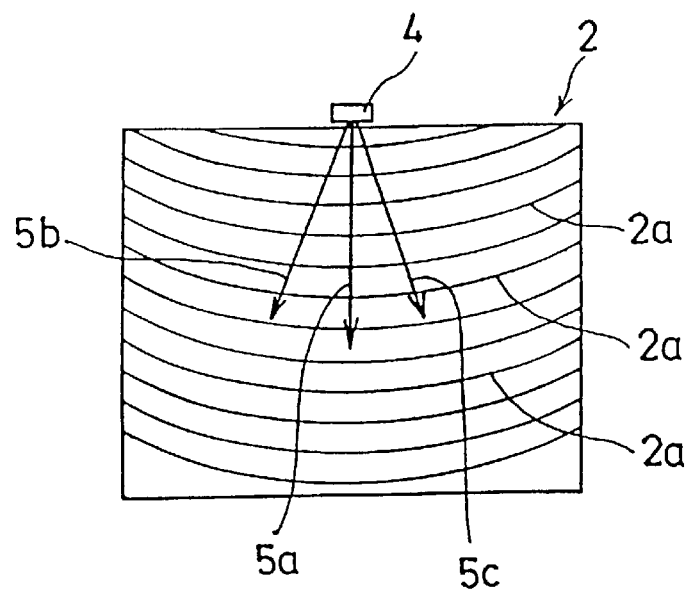
FIG. 3 is a plan view showing schematically the third embodiment of the present invention.

Next, the embodiment shown in FIG. 3 corresponds to the fourth aspect of the present invention, wherein the transparent substrate 2 is rectangular, the light emitting diode 4 is disposed at the central portion of one side of the transparent substrate 2 facing toward the center of the transparent substrate 2 and a plurality of grooves 2a of the transparent substrate 2 are disposed archedly in such a manner as they cross the light emitted from the light emitting diode 4 in a radial direction.

Figure 4:
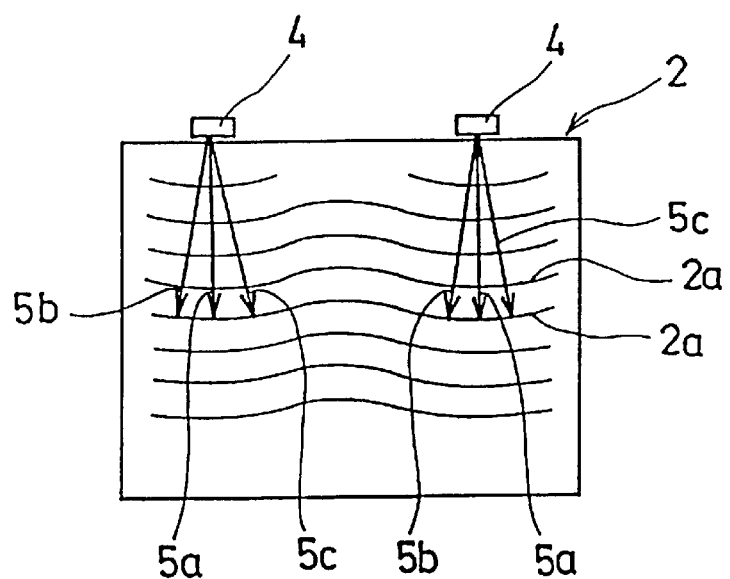
FIG. 4 is a plan view showing schematically the fourth embodiment of the present invention.

Next, the embodiment shown in FIG. 4 corresponds to the fifth aspect of the present invention, wherein the transparent substrate 2 is rectangular, two light emitting diodes 4, 4 are disposed at one side of the transparent substrate 2 at a certain spacing facing toward the opposite side of the transparent substrate 2 and a plurality of grooves 2a of the transparent substrate 2 are disposed archedly in such a manner as they cross the light emitted forward from the light emitting diode 4. In the case where a plurality of spot-like light sources are used, since a peak appears individually at each light source, the arc patterns are arranged to form discretely in accordance with the respective inclination.

Figure 5:
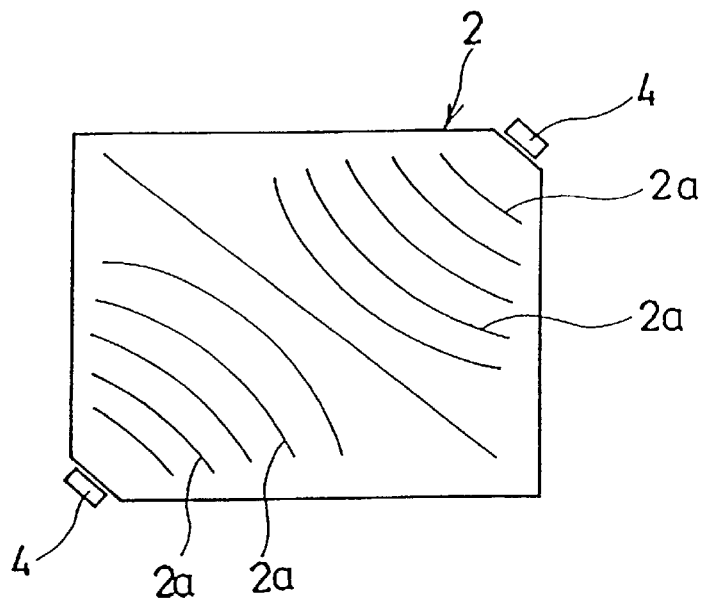
FIG. 5 is a plan view showing schematically the fifth embodiment of the present invention.

Further, the embodiment shown in FIG. 5 corresponds to the sixth aspect of the present invention, wherein the transparent substrate 2 is rectangular, the light emitting diodes 4 are disposed at both corners of a diagonal line facing each other and a plurality of grooves 2a of the transparent substrate 2 are disposed archedly in a manner as they cross the light emitted forward from the emitting diode 4. The optical path is not indicated in this embodiment.

Figure 6:
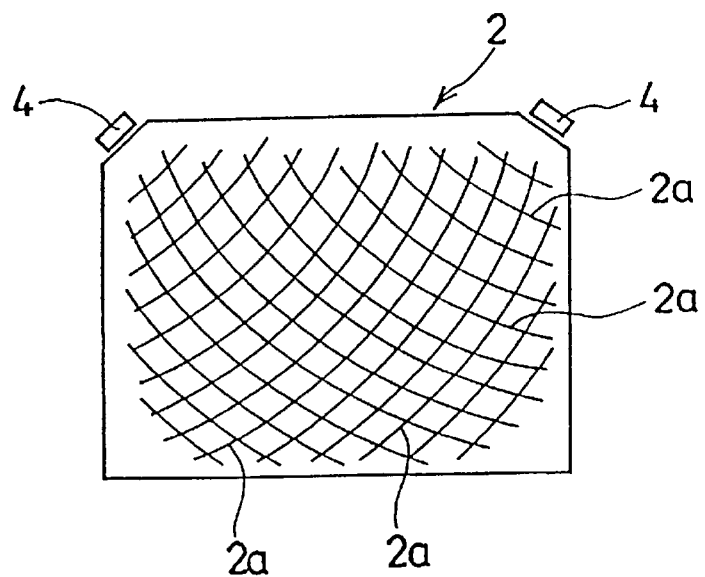
FIG. 6 is a plan view showing schematically the sixth embodiment of the present invention.
Figure 7:
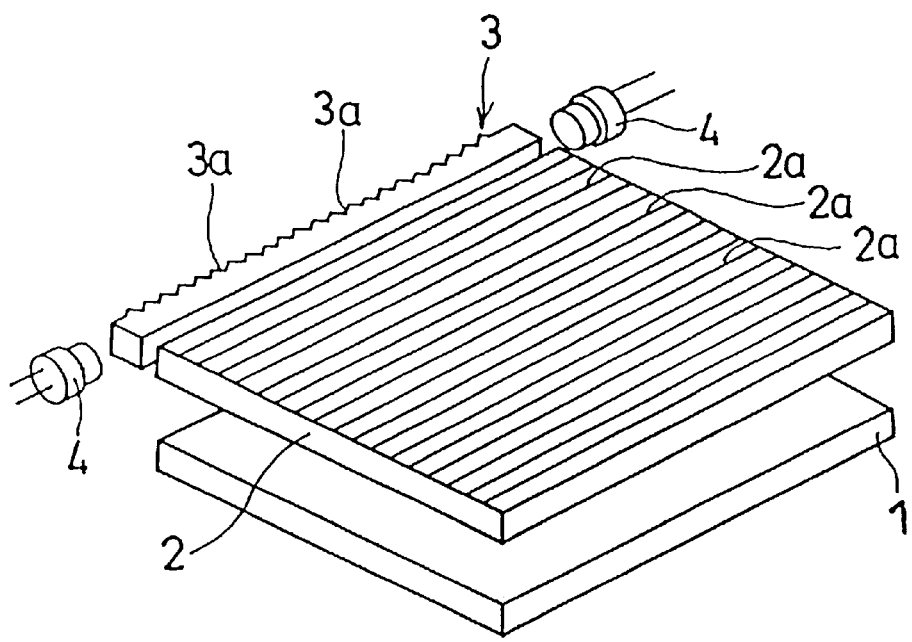
FIG. 7 is a perspective view of a spread illuminating apparatus using a light emitting diode as a spot-like light source.

Finally, the embodiment shown in FIG. 6 corresponds to the seventh aspect of the present invention, wherein the transparent substrate 2 is rectangular, two light emitting diodes 4, 4 are disposed at both corners on one side of the transparent substrate 2 facing diagonally at an angle of 90 degrees from each other, and a plurality of grooves 2a are respectively disposed archedly in a manner they cross the light emitted forward from respective light emitting diode 4. The optical path is not indicated in this embodiment, either.

In either embodiment, since most of the diffused light beams 5a, 5b and 5c are to cross the grooves 2a orthogonally, they are effectively refracted toward the viewing direction to substantially reduce the amount of the light leaking outside. Further, the groove 2a is cited as an example of light emitting element, but this can be replaced with, for example, a convex portion, a curved surface or a combination thereof. In either case, an effect similar, or close to what is achieved with the groove 2a can be achieved.

The present invention relates to the spread illuminating apparatus composed as explained above, and according to the aspects 1 and 2 to 7, the groove of the transparent substrate is to cross orthogonally the most light beams from the light diffused from the emitting diode as a spot-like light source, so that the light to turn aside can be reduced and the light to proceed toward the viewing direction can be increased.

What is claimed is:

1. A spread illuminating apparatus in which at least one spot-like light source is disposed at a periphery of a transparent substrate made of light permeable material and has its emitting face facing said transparent substrate, and light from said spot-like light source is made to be emitted toward the viewing direction of said transparent substrate, wherein a plurality of continuously formed band-like light emitting elements formed on a major surface of said transparent substrate and consisting of at least one of groove, recessed portion, convex portion, and curved surface are disposed curvilinearly, each making an arc defining said spot-like light source as its center in such a manner as they cross orthogonally most light beams available emitted in a radial direction from said spot-like light source so that as much light as possible can be emitted toward the viewing direction.

2. A spread illuminating apparatus according to claim 1, wherein said transparent substrate is rectangular, said spot-like light source is disposed at one corner of the transparent substrate so as to face inside said transparent substrate, a plurality of light emitting elements are provided on said transparent substrate and said light emitting elements are disposed linearly in such a manner as they cross orthogonally as many light beams as available emitted in a radial direction from said spot-like light source so that as much light as possible can be emitted toward the viewing direction.

3. A spread illuminating apparatus according to claim 1, wherein said transparent substrate is rectangular and said spot-like light source is disposed at one corner of said transparent substrate so as to face inside said transparent substrate.

4. A spread illuminating apparatus according to claim 1, wherein said transparent substrate is rectangular, and said spot-like light source is disposed at one side of said transparent substrate so as to face inside said transparent substrate.

5. A spread illuminating apparatus according to claim 1, wherein said transparent substrate is rectangular and a plurality of spot-like light sources are disposed at sides of said transparent substrate at a spacing so as to face inside said transparent substrate.

6. A spread illuminating apparatus according to claim 1, wherein said transparent substrate is rectangular and said spot-like light sources are disposed at one or both corners of a diagonal line of said transparent substrate.

7. A spread illuminating apparatus according to claim 1, wherein said transparent substrate is rectangular and said spot-like light sources are disposed slantwise at both corners of one or a plurality of sides of said transparent substrate.

* * * * *